(12) United States Patent
Hayward et al.

(10) Patent No.: US 7,306,642 B2
(45) Date of Patent: *Dec. 11, 2007

(54) HIGH CTE REACTION-BONDED CERAMIC MEMBRANE SUPPORTS

(75) Inventors: Peter J. Hayward, Pinawa (CA); Richard Higgins, Reading, MA (US); Robert L. Goldsmith, Wayland, MA (US); Bruce A. Bishop, Arlington, MA (US)

(73) Assignee: CeraMem Corporation, Waltham, MA (US)

( * ) Notice: Subject to any disclaimer, the term of this patent is extended or adjusted under 35 U.S.C. 154(b) by 390 days.

This patent is subject to a terminal disclaimer.

(21) Appl. No.: 10/783,497

(22) Filed: Feb. 20, 2004

(65) Prior Publication Data
US 2005/0183407 A1    Aug. 25, 2005

Related U.S. Application Data

(63) Continuation-in-part of application No. 10/097,921, filed on Mar. 13, 2002, now Pat. No. 6,695,967.

(51) Int. Cl.
*B01D 53/22* (2006.01)
*B01D 46/00* (2006.01)
*B04B 35/65* (2006.01)

(52) U.S. Cl. ............... 55/523; 55/282.3; 55/385.3; 55/DIG. 10; 60/311; 96/4; 96/11; 210/490; 210/500.25; 210/510.1; 419/2; 264/43; 264/628; 264/630; 264/DIG. 48

(58) Field of Classification Search .......... 55/282.3, 55/385.3, 523, DIG. 10; 60/311; 96/4, 11; 210/490, 496, 500.25, 510.1; 419/2, 41, 419/19; 428/116, 188, 304.4; 75/234, 235, 75/249; 501/80, 94, 102, 103, 108, 118, 501/120; 264/41, 42, 43, 628, 630, DIG. 48
See application file for complete search history.

(56) References Cited

U.S. PATENT DOCUMENTS

| | | | |
|---|---|---|---|
| 3,885,977 A | 5/1975 | Lachman et al. | 106/62 |
| 3,899,326 A | 8/1975 | Frost et al. | 75/214 |
| 4,060,488 A | 11/1977 | Hoover et al. | 210/433 M |
| 4,069,157 A | 1/1978 | Hoover et al. | 210/433 M |
| 4,126,479 A * | 11/1978 | Videtto | 501/120 |
| 4,244,898 A * | 1/1981 | Bandyopadhyay et al. | 264/628 |
| 4,781,831 A | 11/1988 | Goldsmith | 210/247 |
| 4,894,160 A | 1/1990 | Abe et al. | 210/510.1 |
| 5,009,781 A | 4/1991 | Goldsmith | 210/247 |
| 5,108,601 A | 4/1992 | Goldsmith | 210/247 |
| 5,195,319 A | 3/1993 | Stobbe | 60/303 |
| 5,223,318 A | 6/1993 | Faber et al. | 428/116 |
| 5,326,519 A | 7/1994 | Claussen | 264/65 |
| 5,415,775 A | 5/1995 | Castillon et al. | 210/490 |
| 5,497,620 A | 3/1996 | Stobbe | 60/303 |
| 5,599,383 A | 2/1997 | Dyer et al. | 96/8 |
| 5,607,586 A | 3/1997 | Grangeon et al. | 210/321.78 |
| 5,607,630 A | 3/1997 | Claussen | 264/60 |
| 5,641,332 A | 6/1997 | Faber et al. | 55/523 |
| 5,681,373 A | 10/1997 | Taylor et al. | 96/11 |
| 5,824,220 A * | 10/1998 | Grangeon et al. | 55/523 |
| 5,843,859 A | 12/1998 | Claussen | 501/128 |
| 5,855,781 A | 1/1999 | Yorita et al. | 210/321.82 |
| 6,025,065 A | 2/2000 | Claussen et al. | 428/307.7 |
| 6,051,277 A | 4/2000 | Claussen et al. | 427/376.3 |
| 6,077,436 A | 6/2000 | Rajnik et al. | 210/650 |
| 6,565,632 B1 | 5/2003 | Van Hassel et al. | 96/10 |
| 6,695,967 B2 * | 2/2004 | Bishop et al. | 210/510.1 |
| 2003/0190486 A1 | 10/2003 | Roa et al. | 428/469 |
| 2005/0181928 A1* | 8/2005 | Hayward et al. | 501/108 |

FOREIGN PATENT DOCUMENTS

| FR | 2.061.933 |   | 6/1971 |
|---|---|---|---|
| JP | 4-198058 | * | 7/1992 |

OTHER PUBLICATIONS

Separation and Purification Methods, 31(1), 1-169 (2002); S.N. Paglieri et al.; "Innovations in Palladium Membrane Research"pp. 1 & 35-41.
J.Am. Ceram Soc. 76[4] 970-80 (1993); Suxing Wu et al.; "Mechanisms and Kinetics of Reaction-Bonded Aluminum Oxide Ceramics".
J.Am.Ceram Soc. 80[6] 1508-16 (1997); Greg A. Ward et al.; "Synthesis of Barium Hexaferrite by the Oxidation of a Metallic Barium-Iron Precursor".
J.Am Ceram Soc. 77 [77] 2898-904 (1994); Suxing Wu et al.; "Reaction Bonding and Mechanical Properties of Mullite/Silicon Carbide Composites".

* cited by examiner

*Primary Examiner*—Jason M. Greene
(74) *Attorney, Agent, or Firm*—Brian M. Dingman; Mirick, O'Connell, DeMallie & Lougee, LLP

(57) ABSTRACT

A porous ceramic support for a gas separation membrane formed by sintering a green body containing grains of a refractory ceramic oxide with a high coefficient of thermal expansion and grains of a reactive binder precursor. Upon sintering, the reactive binder precursor reacts with at least one gaseous, liquid or solid reactant to create a reaction bond that binds the refractory ceramic oxide grains. The support configuration can be a tubular, flat plate, hollow fiber, or multiple-passageway monolith structure.

13 Claims, No Drawings

HIGH CTE REACTION-BONDED CERAMIC MEMBRANE SUPPORTS

RELATED U.S. PATENT AND APPLICATION DATA

This application claims the benefit of nonprovisional application No. 10/097,921, "Reaction Bonded Alumina Filter and Support," filed Mar. 13, 2002 (U.S. Pat. No. 6,695,967), of which this application is a Continuation-in-Part, and which is included herein by reference.

Nonprovisional application No. 10/685,057, "Membrane Devices Using Reaction Bonded Monolith Supports," filed Oct. 14, 2003; and nonprovisional application No. 10/777,231, "Reaction Bonded Porous Magnesia Body," filed Feb. 12, 2004; are included herein by reference.

FIELD OF THE INVENTION

This invention relates to a porous membrane support with a high coefficient of thermal expansion. The support is made by forming a green (i.e., unfired) body of mixed powders containing refractory grains of a high coefficient of thermal expansion (CTE) ceramic material as well as reactive grains of at least one compound or element. During sintering, oxidation or reaction of reactive grains creates a reaction bond that binds the refractory grains. A preferred reaction is the oxidation of grains of an element that occurs with a concomitant expansion that counteracts the shrinkage caused by sintering, giving an overall volume change in a fired body from the green body that is negligibly small or zero. The resulting fired body is porous, and may be used as a support for a semi-permeable membrane, especially a high-CTE gas separation membrane. Support configurations can include tubular, plate, hollow fiber, and especially multi-channel monolith structures.

BACKGROUND OF INVENTION

Supports for Gas Separation Membranes. As is well known in the art, porous inorganic support materials for gas separation membranes can be classed into different categories: Metallic, ceramic, and glass. This invention is relevant to porous ceramic supports. Also, as well know in the art, support configurations can include at least the following: Tubular (with membrane on inner lumen or exterior surface), plate (for use generally in a stacked plate structure), hollow fiber (with membrane on the interior lumen surface, or more often the exterior surface), and multiple-passageway monolith structures (with the membrane coating applied to the passageway wall surfaces). This invention is applicable to all these membrane module configurations, but is especially suitable for high surface area multiple passageway monolith supports.

Ceramic Honeycomb Monoliths. Extruded ceramic honeycomb monoliths were initially developed as catalyst supports for automotive catalytic converters, environmental catalyst supports for fixed site installations, and diesel particulate filters. These monoliths have a multiplicity of passageways that extend from one end face to an opposing end face. The cell structure is formed by an extrusion process, with a cell density ranging from 9 to 1400 cells per square inch. For monoliths with circular cross sections, diameters can be as large as 12 inches, or greater. The length of such extruded monoliths can be over 6 feet, and is limited only by such factors as the available facilities for uniform drying and sintering. Numerous patents exist for such monoliths produced from cordierite (e.g., Lachman and Lewis in U.S. Pat. No. 3,885,997, and Frost and Holleran in U.S. Pat. No. 3,899,326) and silicon carbide (e.g., Stobbe in U.S. Pat. No. 5,195,319 and U.S. Pat. No. 5,497,620). However, ceramic monoliths with large diameters and lengths are generally difficult to manufacture using materials other than cordierite, silicon carbide or mullite, all of which have relatively low coefficients of thermal expansion (CTE).

Cordierite has frequently been used to produce monoliths because it has a CTE of $\sim 1 \times 10^{-6}/°$ C. and a microcracked structure. The low CTE and microcracked structure minimize differential mechanical stresses during the high temperature sintering and cool-down processes, thereby avoiding fracture.

Mullite has a somewhat higher CTE of $\sim 4.5 \times 10^{-6}/°$ C. However, its superior mechanical properties confer good thermal shock resistance, and the use of appropriate starting materials for mullite formation allows extruded bodies, including monoliths, to be sintered and cooled with a tolerable level of firing shrinkage that gives minimal formation of microcracks.

Silicon carbide monoliths, with a CTE of about 3.5-4×$10^{-6}/°$ C., have superior thermal and mechanical properties that permit their sintering and cooling without fracturing. First, the relatively high thermal conductivity of silicon carbide (~5 W/m-K) relieves thermal gradients within the monolith. Second, the relatively high mechanical strength allows greater stress tolerance during sintering and cool-down.

In summary, present methods for manufacturing honeycomb-structured monoliths involve extrusion of suitably plastic batch materials through a die, followed by drying and sintering at an appropriate temperature to produce the final monolith. The choice of materials currently available for monolith fabrication is restricted to those that have a low CTE in order to prevent deformation and/or cracking of the monolith during sintering and subsequent cooling. At present, large honeycomb-structured monoliths are only commercially available in relatively low CTE materials, such as cordierite, mullite and silicon carbide.

Porous Ceramic Monoliths as Membrane Supports. Small-diameter ceramic monoliths are widely used as supports for inorganic membrane devices, and the patent art contains descriptions of monoliths produced from many different materials. Perhaps the earliest disclosure was in the French Patent Publication 2,061,933, filed Oct. 3, 1969 by the Commissariat a L'Energie Atomique, which describes a multi-channel $\alpha$-alumina monolith as a support for an $\alpha$-alumina ultrafiltration membrane. In 1978 Hoover and Roberts (U.S. Pat. No. 4,069,157) described the use of cordierite honeycomb monoliths as supports for dynamically formed membranes. In 1984, Gillot, et al., presented a paper "New Ceramic Filter Media for Cross-Flow Microfiltration and Ultrafiltration" (*Filtra* 1984 *Conference, Oct.* 2-4, 1984) that described the use of sintered $\alpha$-alumina membranes deposited on sintered $\alpha$-alumina monolith supports, closely related to the CEA French patent mentioned above. Abe, et al. (U.S. Pat. No. 4,894,160) disclosed the use of clay-bonded $\alpha$-alumina as a honeycomb monolith support. In 1993 Faber and Hudgins described the use of titania as a monolith membrane support (U.S. Pat. No. 5,223,318). In 1995 Castillon and Laveniere (U.S. Pat. No. 5,415,775) disclosed the use of a mixture of titania/$\alpha$-alumina monoliths as membrane supports. Grangeon and Lescoche describe metal oxide monolith supports containing titania in combination with other metal oxides, especially alumina (U.S. Pat. No. 5,607,586 and U.S. Pat. No. 5,824,220).

In general, porous α-alumina, configured in tubular and monolith structures, is the most common material used as a support for ceramic membranes, but only as small diameter elements. Such porous α-alumina materials are most commonly produced by sintering a monodisperse alumina at temperatures of 1600° C. to 1800° C. The use of clay, or other metal oxides, or fine α-alumina reactive binders can reduce the sintering temperature needed.

Large diameter honeycomb monoliths have been used for membrane supports for membrane devices. For example, the patents of Hoover and Roberts (U.S. Pat. No. 4,069,157), Hoover and Iler (U.S. Pat. No. 4,060,488), Goldsmith (U.S. Pat. No. 4,781,831, U.S. Pat. No. 5,009,781, and U.S. Pat. No. 5,108,601), Faber and Frost (U.S. Pat. No. 5,641,332), Yorita, et al., (U.S. Pat. No. 5,855,781), and Rajnik, et al. U.S. Pat. No. 6,077,436) disclose such devices.

The above large diameter monoliths used as membrane supports have all been conceptual designs or made from ceramic materials (cordierite, mullite or silicon carbide) that can be extruded, dried and sintered in large diameter parts while maintaining mechanical integrity. The decisive disadvantage of ceramics and ceramic composites formed by such a process is the high linear shrinkage that usually occurs between the green body and the final product, typically in the range of 5% to 15%. This shrinkage is problematic when trying to maintain the shape and dimension of a part. Shrinkage during sintering and cool-down can lead to the formation of cracks and other defects, up to and including the fracture of large parts.

Reaction Bonded Alumina Materials. Claussen has disclosed reaction-bonded alumina (RBAO) materials, in which α-alumina and related ceramic bodies are formed from precursor materials that react and retain "near net shape" during firing, i.e., undergo a negligible volume change in converting from the green (unfired) body to the sintered state (Claussen, U.S. Pat. No. 5,607,630). The RBAO process includes the use of powdered aluminum metal and ceramic grains in the batch formulations to form green bodies. During heating, the aluminum metal powder undergoes a volumetric expansion as a consequence of oxidation, and this volume increase offsets the normal shrinkage due to sintering of the ceramic grain constituents. The work of Claussen and those of several other groups active in the RBAO field focus on fabrication of near net shape bodies with low to negligible porosity. This low porosity and small pore size is achieved, in part, because the metal and ceramic grains used in the forming of the bodies are reduced to about 1 μm by aggressive attrition milling. Relatively high metal grain contents are also used, and this leads to filling of the pore volume during the oxidative expansion of the metal.

Claussen, et al., have also disclosed the fabrication of analogous near net shape ceramic bodies from other ceramic materials (Claussen, et al., in U.S. Pat. No. 5,326,519, U.S. Pat. No. 5,843,859, U.S. Pat. No. 6,025,065 and U.S. Pat. No. 6,051,277).

Variations on the chemistry of the process have also been reported, including the incorporation of $ZrO_2$ in the RBAO body (Wu, et al., *J. Am. Ceram. Soc.*, 76 (1993) 970), oxidation of a metallic Ba—Fe precursor to barium hexaferrite (Ward and Sandhage, *J. Am. Ceram. Soc.*, 80 (1997) 1508), and the oxidation of aluminum with SiC to form mullite/alumina/SiC composites (Wu and Claussen, *J. Am. Ceram. Soc.*, 77 (1994) 2898). The results of Wu, et al., are also included, in part, in the Claussen patents cited above. In all cases, however, the intention has been to form a dense ceramic part with essentially no open porosity.

More recently, the present Applicant has been awarded a patent by the United States Patent and Trademark Office for reaction bonded alumina filters and membrane supports (Bishop, et al., U.S. Pat. No. 9,695,967).

Inorganic Gas Separation Membranes. Inorganic gas separation membranes may be classed into at least three categories: Dense metallic membranes, dense ion transport oxide membranes, and microporous silica and zeolite membranes. Included in the category of metallic membranes are palladium, palladium-copper and palladium-silver alloys for hydrogen separations. For ion transport membranes, mixed conducting oxides are useful for separations of oxygen or hydrogen (the permeable species). For microporous oxide membranes, silica and a wide range of zeolite structures have been developed.

Many of these membrane materials have a relatively high coefficient of thermal expansion. Deposition of these membranes as a thin film onto a microporous support structure requires a reasonably close match between the CTE of the support and the CTE of the membrane layer. Table 1 provides ranges of CTEs for most inorganic gas separation membranes. The membranes relevant for the present invention are those that can be classed as metallic membranes and dense ion transport membranes, which have CTEs in excess of about $10 \times 10^{-6}$/C.

TABLE 1

Coefficients of Thermal Expansion of Gas Separation Membranes

| Membrane Material | CTE, $\times 10^6$/° C. |
|---|---|
| Palladium and palladium alloys | 12 to 16 |
| Dense oxide ion transport | 9 to 20 |
| Microporous silica | 1 to 3 |
| Zeolites | −1 to 6 |

Deposition and use of the high-CTE membranes under conditions of temperature cycling requires use of support materials with similarly high CTE values. Porous α-alumina (CTE of ~$8.2 \times 10^{-6}$/° C.) is at the lower CTE limit for a useful porous support material for palladium (and other metallic) membranes, as well as for low-CTE dense ITM membranes.

For ion transport membranes, supports can be metallic or ceramic. For ceramic supports, other than porous supports of the same mixed oxide composition of the ion transport membrane itself, different pure phase ceramic oxides have been used. For example, U.S. Pat. No. 5,599,383 (Dyer, et al.) and U.S. Pat. No. 5,681,383 (Taylor, et al.), both assigned to Air Products and Chemicals, Inc. disclose ceramic non-ion conducting supports including alumina, ceria, silica, magnesia, titania, stabilized zirconia, and mixtures thereof. Porous ceramic supports for ion transport membranes are also disclosed in U.S. Pat. No. 6,565,632 (van Hassel, et al.), assigned to Praxair Technology, Inc., including magnesia, alumina, ceria, and zirconia.

Supports used for palladium-based membranes are described by S. N. Paglieri and J. D. Way in "Innovations in Palladium Membrane Research", in *Separation and Purification Methods*, 31(1), 1-169 (2002), specifically in pages 35-41. Support materials cited include ceramic, Vycor glass and stainless steel. Among ceramics named are alumina, titania, and stabilized zirconia. Roa, et al., in USP Application 2003/0190486 describe supports for palladium alloy membranes, including pure phase oxide ceramics (alumina, titania, and zirconia) and non-oxide ceramics (silicon carbide and silicon nitride) and sintered porous metals (stainless steel and nickel). The examples in the application employ alumina membrane coated alumina supports.

Support configurations for the above gas separation membranes have included primarily tubular elements and stacked plate devices, and in some instances multiple passageway monoliths and hollow fibers. The present invention is suitable for these support configurations, but is especially well suited for large diameter monolith supports. The invention has as its central feature the use of high-CTE, reaction-bonded ceramic materials as membrane supports, the materials preferably exhibiting nil or very low (<5% linear) shrinkage during the sintering of the green support structure body. This invention is similar to the Applicant's use of RBAO as a membrane support for membranes (Bishop et al., U.S. Pat. No. 6,695,967).

Alternative High CTE Ceramics for Membrane Supports. There are only a few oxide ceramics with relatively high CTEs that can be considered in reaction-bonded forms for practical, cost-effective production of membrane supports. Most notable are the single oxides of alumina (CTE of ~8.2×10$^{-6}$/° C.), titania (CTE of ~8.8×10$^{-6}$/° C.), stabilized zirconia (CTE of ~10.0×10$^{-6}$/° C.) and magnesia (CTE of ~13.5×10$^{-6}$/° C.), the mean CTEs given for the temperature range of 25-1,000° C. Additionally, there is the possibility of using high CTE ceramic compounds for membrane supports. These compounds include, but are not restricted to, magnesium orthosilicate (forsterite, $Mg_2SiO_4$) and magnesium aluminate (spinel, $MgAlO_2$), which have mean 25-1,000° C. CTE values of ~10.5×10$^{-6}$/° C. and ~8.5×10$^{-6}$/° C., respectively. The present invention is based on the use of such ceramic oxides and/or compounds as porous supports, and employs a reaction-bonding mechanism during firing of the formed green support using elemental or other reactive binder precursors.

SUMMARY OF INVENTION

It is therefore an object of this invention to provide an improved, high-CTE porous ceramic substrate as a support for gas separation membranes.

It is a further object of this invention to provide such a substrate that has a mean pore size and porosity required to effectively serve as a support for a pressure driven membrane device.

It is a further object to provide such a substrate that exhibits small to negligible volume change on sintering of the support green body.

It is a further object of this invention to provide such a support in the form of an extruded, multiple-passageway monolith.

It is a further object of this invention to provide such a porous substrate in a monolith with a high ratio of surface area to volume in the walls bounding each passageway.

This invention results from the realization that the fabrication of such a substrate is most readily achieved using a green body composition that undergoes minimal volume change on sintering, and that this can be accomplished by forming a green body containing thermally refractory ceramic grains of a high CTE ceramic which are bonded during sintering by a reaction bonding mechanism involving at least grains of one reactive binder precursor in the green body. A desirable reactive binder includes at least one element that undergoes a volumetric expansion upon sintering with at least one gaseous, liquid or solid phase reactant to bond the refractory grains. This invention also results from the realization that certain minimum porosity and permeability properties of the membrane support are required for composite membrane devices. This invention also realizes that incorporating a ceramic powder with a particle size distribution above a certain minimum size range is needed to produce the minimum pore size and permeability requirements for the effective use of such devices. Finally, this invention realizes that porous multiple passageway monolith substrates are especially useful as supports for gas separation membrane devices.

This invention features a porous ceramic support for a gas separation membrane formed by sintering a green body containing refractory grains of at least one simple or compound ceramic oxide and grains of at least one reactive binder precursor, wherein the coefficient of thermal expansion of the refractory grains is greater than about 8×10$^{-6}$/° C., the grains of the reactive binder precursor are reacted with at least one gaseous, liquid, or solid phase reactant to form a reaction bond to bind the refractory grains, and the mean pore size of the support is greater than about 1 micron.

In one embodiment the support is sintered in an oxidizing atmosphere. In another embodiment, the support configuration can be selected from the group including multi-channel monoliths, tubular elements, hollow fibers, and plate structures. In another embodiment, the size of the refractory grains can be in the range of about 5 to 200 microns. The refractory grains can be selected from the group including alumina, titania, zirconia, magnesia, forsterite, spinel, and mixtures thereof. The change in volume of the sintered ceramic support from that of the green body can be less than about 5%.

In another embodiment, the reactive binder precursor can contain grains of an element. For this embodiment, the element can be selected from the group containing aluminum, silicon, titanium, zirconium, and mixtures thereof. Alternatively, the reactive binder precursor can contain grains of at least one ceramic compound. For this latter embodiment, the ceramic compound can be selected from the group containing alumina, silica, titania, zirconia, magnesia, and carbides and nitrides of silicon, aluminum, zirconium, and titanium.

In any embodiment, the grain size of the reactive binder precursor is preferably less than about 10 microns.

In a preferred embodiment, this invention features a porous, ceramic, multi-channel monolith gas separation membrane support formed by sintering a green body containing refractory grains of at least one simple or compound ceramic oxide and grains of at least one reactive binder precursor, wherein the coefficient of thermal expansion of the refractory grains is greater than about 8×10$^{-6}$/° C., the pore size of the monolith support is in the range of about 1 to 50 μm, and the volume change of the monolith support during sintering is less than about 5%.

This invention also features a method of forming a porous membrane support of ceramic oxide material, which comprises making a mixture containing refractory grains of at least one simple or compound ceramic oxide with a coefficient of thermal expansion greater than about 8×10$^{-6}$/° C. and grains of at least one reactive binder precursor, forming the mixture into a green body, sintering the green body to react the grains of the reactive binder precursor with at least one gaseous, liquid, or solid phase reactant to form a reaction bond to bind the refractory grains, and cooling the sintered body.

DETAILED DESCRIPTION OF THE INVENTION

The present invention relates to the production of high-CTE, porous, reaction-bonded ceramic membrane supports that can be formed, preferably with small to negligible volume change during sintering. Such materials, when fabricated specifically into monolith structures, exhibit high surface-area to volume ratios and can be used, for example, as membrane supports in membrane devices for elevated-temperature gas separations. The use of such high-CTE supports enables matching, within certain limits, of the CTEs of the supports and the deposited gas separation membrane.

The porous membrane support can be fabricated in several configurations, including tubular elements, plates for a stacked plate configuration, hollow fibers, and monoliths that contain a plurality of passageways that extend from a feed inlet end face to a retentate outlet end face, all of which are well known in the art.

The basis for the invention involves forming of a precursor ("green") ceramic substrate by extrusion, or by other means, of a mixture containing both relatively coarse, high-CTE ceramic oxide grains and reactive grains of one or more elements or ceramic grains. As a further option, the fine powder fraction may include additional ceramic oxides or compounds and other chemicals as a means of controlling the dimensional changes, strength, porosity and permeability of the ceramic substrate after firing. Also, appropriate organic binders and plasticizers may be included in the batch formulation to assist fabrication and/or to give improvements in the final ceramic properties. For green bodies containing such mixtures, especially with grains of certain elements as reactive binder precursors, the shrinkage that accompanies sintering to form the final ceramic device can be counteracted by expansion that occurs from oxidation of the element grains or reaction of the reactive grains. In the current invention, however, the overall porosity is largely defined by the initial packing of the coarse refractory ceramic particles, which are chosen to undergo minor volume change during sintering. The strength of the sintered body is derived from the creation of "necks" between the coarse and fine particles during reaction and/or oxidation and sintering of the reactive grains.

The coarse ceramic oxide grain can be a simple oxide (single cation), such as $\alpha$-alumina, titania, stabilized zirconia, or magnesia, which will shrink minimally during the sintering process. All have relatively high CTEs. Other simple ceramic oxides with high CTE values that could potentially be used include $CeO_2$ (CTE~$8.5 \times 10^{-6}$/° C.), $Cr_2O_3$ (CTE~$9.6 \times 10^{-6}$/° C.), $Y_2O_3$ (CTE~$9.3 \times 10^{-6}$/° C.), NiO (CTE~$10\text{-}15 \times 10^{-6}$/° C.), and $Fe_2O_3$ (CTE~$12 \times 10^{-6}$/° C.). Ceramic compound oxides (two or more cations) such as $Mg_2SiO_4$ (forsterite, CTE~$10.5 \times 10^{-6}$/° C.) and $MgAl_2O_4$ (spinel, CTE~$8.5 \times 10^{-6}$/° C.) may also be used as the coarse ceramic grain. The coarse ceramic grain material preferably has a narrow particle size distribution so that the porosity of the final monolith is maximized. The typical particle size of a preferred ceramic grain is a mean particle diameter in the range of about <5 to 200 μm. This size of grain will result in a desirable mean pore size range of about 1 to 50 μm.

The gas atmosphere during sintering is preferably an oxidizing atmosphere, containing oxygen or steam. However, some reaction bonding mechanisms can occur in a non-oxidizing atmosphere with a gas-phase reactant such as nitrogen, or in an inert atmosphere in which the solid constituents in the green body are sufficient to form the reaction bond.

With regard to the reaction-bonding grains, if grains of elements are used, several characteristics are desirable. First, a preferred element will have a Pilling-Bedworth ratio (P-B ratio) greater than one. The P-B ratio relates to the volume expansion of the element (usually a metal) during oxidation, typically as the result of heating in an oxygen-containing atmosphere. It is defined as the ratio of the molar volume of the resulting metal oxide to that of the precursor metal prior to oxidation. Thus, a P-B ratio >1.0 indicates that the metal undergoes a volumetric expansion during oxidation.

A second requisite is that the oxide reaction product should exhibit thermal stability (i.e., not undergo any disruptive reactions or phase changes) at all temperatures below the sintering temperature. Additionally, the oxide reaction product should be able to bond to the coarse ceramic grains in the body during high temperature sintering, thereby imparting adequate strength to the fired body. Furthermore, the oxide reaction product should have a relatively high CTE and low CTE anisotropy to minimize CTE mismatch of the component phases in the sintered body. In some cases, it may be desirable that the elemental powder melts and wets the coarse ceramic grains prior to oxidation. Finally, the element should be safe for a manufacturing process and have an acceptable cost.

Elements that can satisfy these requirements include aluminum, silicon, titanium, zirconium, and mixtures thereof. Preferably, the particle size of the element grain is smaller than that of the coarse ceramic grain, typically with a mean particle diameter of <1 micron up to about 10 microns. Properties of some preferred elements are summarized in Table 2.

TABLE 2

Properties of Elements for Use in Reaction-Bonded Gas Separation Membrane Supports

| Element | P-B Ratio | Oxide CTE, $\times 10^6$/° C. |
|---|---|---|
| Aluminum | 1.29 | 8.2 |
| Titanium | 1.56 | 8.8 |
| Zirconium | 1.76 | 10 |
| Silicon: Si oxidizes to $\alpha$-quartz at temperatures up to 573° C., to $\beta$-quartz at 573-870° C., or to tridymite at 870-1470° C. Above 1470° C., Si oxidizes to $\beta$-cristobalite. Metastable cristobalite usually persists during cooling. | 1.88-2.15 (depending on $SiO_2$ polymorph formed) | Undergoes displacive $\beta/\alpha$ transitions during cooling, notably $\beta/\alpha$cristobalite transition at ~270° C. |

As indicated in Table 2, the high-temperature oxidation of Si to produce $\beta$-cristobalite, the thermodynamically stable $SiO_2$ phase above 1470° C., is an undesirable product during sintering of a reaction bonded substrate because $\beta$-cristobalite typically persists as a metastable phase during subsequent cooling, and undergoes a displacive transition to $\alpha$-cristobalite at ~270° C., accompanied by a large volume change that would cause fracture of the substrate. An important property of Si during high temperature oxidation, however, is that the resulting oxide can undergo a near-simultaneous reaction with other oxides to form high CTE compounds with a concomitant increase in volume. An example of this phenomenon is the near-simultaneous reaction of oxidized Si with MgO to form forsterite. Thus, if there is sufficient MgO available, the reaction leaves no free silica (cristobalite, etc.) in the fired body.

Similarly, Al metal can also undergo oxidation and near-simultaneous reaction with other oxides to form high CTE compounds, such as the reaction with MgO to produce spinel, which is also accompanied by a volume increase. The volume changes associated with these reactions can be used to minimize or eliminate high temperature shrinkage from sintering, and are summarized in Table 3.

TABLE 3

Volume Changes from Oxidation and Near-Simultaneous Reaction To form High-CTE Compounds

| Oxidation/Reaction | Volume Change | Product, CTE |
| --- | --- | --- |
| $Si + O_2 + 2MgO \rightarrow Mg_2SiO_4$ | 29.6% expansion | Forsterite, ~10.5 × $10^6$/° C. |
| $4Al + 3O_2 + 2MgO \rightarrow 2MgAl_2O_4$ | 26.5% expansion | Spinel, ~9 × $10^6$/° C. |

Further, the reaction bond can be accomplished by other than addition of grains of an element. For example, grains of fine magnesia and grains of fine silica can be used with any of several larger refractory ceramic filler grains. On sintering, the magnesia and silica can react to form a forsterite-bonded body. Analogously, fine alumina and fine magnesia can react to form a spinel-bonded body.

Additional ceramic oxides and compounds can also be included in the mixture of coarse ceramic and fine elemental grains to impart desired structural or chemical properties. These possible additions include fine alumina, zirconia, titania, magnesia, ceria and mixtures thereof, with grain sizes in the approximate range of 10 nm to 1 µm. Such additions can give enhanced bonding strength and improved permeability during sintering by participating in the reaction-bonding mechanism, or by causing changes in the sintering mechanism and in the resulting ceramic microstructure.

Additionally, small amounts of other chemicals may be added to assist high temperature sintering. These sintering aids include compatible materials that will form liquid phases at the sintering temperature, thereby accelerating the rate of material transfer between the solid ceramic grains to form necks. For magnesia, of interest as a high CTE oxide, small amounts (<1 wt %, preferably <0.5 wt %) of LiF (m.pt. 870° C. m pt., 1676,° C. b.pt.), $MgCl_2$ (m.pt. 708° C., b.pt 1412° C.), or $MgF_2$ (m.pt. 1266° C., b.pt >2200° C.) can be used to promote sintering. The F⁻ ion has an almost identical ionic radius to the O⁻ ion, and F readily dissolves in most oxide structures up to a few wt. %, so that the effect on MgO properties is minimal. The use of $MgCl_2$ as a sintering aid is described in K. Hamano, Z. Nakagawa, and H. Watanabe, "Effect of Magnesium Chloride on Sintering of Magnesia," in Advances in Ceramics, Vol. 10, Structure and Properties of MgO and $Al_2O_3$ Ceramics, ed. W. D. Kingery, (The American Ceramic Society: Columbus, 1984) p. 610.

A variety of organic additives can be employed as lubricants to facilitate extrusion or other means of forming a green body, including stearic acid, wax emulsions, etc. Organic binders are also employed to impart strength to the extrudates and to facilitate handling of the green body. Typical organic binders include methylcellulose, carboxymethylcellulose, polyvinyl alcohols, and other polymeric ceramic binders. The use of lubricants and organic binders is well known in the art and widely employed in the commercial production of extruded ceramic bodies, including monoliths and other substrates.

EXAMPLE 1

Pressed pellets containing zirconium, zirconia, and magnesia grains were fired in air to produce zirconia-bonded magnesia pellets (RBZM), which were characterized by various means. Table 4 shows the batch compositions of three formulations examined, using progressively increasing Zr metal contents.

TABLE 4

Batch Compositions Used for Firing Trials

| Component | RBZM-1 | RBZM-2 | RBZM-3 |
| --- | --- | --- | --- |
| Coarse magnesia (Cerac M-1138, 95% .pure, −140 mesh +325 mesh) | 47.3 g | 48.3 g | 49.3 g |
| Yttria-stabilized $ZrO_2$ (Magnesium Elektron Inc., type 5Y, 0.6 µm, 8% $Y_2O_3$) | 22.3 g | 17.0 g | 11.6 g |
| Zr metal powder (Alfa Aesar, stock #00847, 95+ % purity, 2-3 µm) | 8.0 g | 12.3 g | 16.7 g |
| Tylose MH300 methyl cellulose | 4.2 g | 4.2 g | 4.2 g |
| Elvanol grade 85-82 polyvinyl alcohol (PVA), 7 wt. % solution in water | 1.1 g | 1.1 g | 1.1 g |
| Stearic acid | 1.1 g | 1.1 g | 1.1 g |
| Ethylene glycol | 0.4 g | 0.4 g | 0.4 g |
| Ethanol | 4.0 g | 4.0 g | 4.0 g |
| Water. | 7.7 g | 7.7 g | 7.7 g |

Mixing, Pressing and Firing Procedures: In all cases, the inorganic powders were briefly milled with dry alumina media to break up agglomerates. After removal of the media and blending in of the methylcellulose powder, the solids were thoroughly mixed with a solution of stearic acid in warm ethanol. Finally, a mixed solution of the ethylene glycol, PVA solution and pure water components was added and blended in. The batch was then sealed in polyethylene and stored overnight to allow hydration of the methylcellulose powder.

A series of eight ~4-g pellets of each mix were pressed between 2.5-cm filter paper disks (to prevent sticking) in a 1.0-inch diameter hardened steel die at a pressure of ~2800 psi. The pellets were then dried at 100° C. for 1-2 hours in a forced air convection oven.

Two furnaces were used for pellet firing a programmable silicon carbide (Carbolite) muffle furnace for precise control of heating rates at lower temperatures, and a programmable molybdenum disilicide (CM) box furnace for sintering at higher temperatures (≧1500° C.). The firing schedules were as follows:

Carbolite furnace: The pellets were fired to 800° C. at 1° C./min, and then from 800 to 1400° C. at 4° C./min, followed by immediate cooling to room temperature at 10° C./min. The pellets were then transferred to the CM furnace.

CM furnace: The pellets were re-fired to 1500° C. at 10° C./min, holding for 2 hours at 1500±10° C. before cooling to room temperature at 10° C./min.

Shrinkage, Porosity, Permeability and (Cold) Modulus of Rupture Measurements: The properties of each series of 8 pellets were measured using standard techniques, with the results (±2 standard deviations) shown in Table 5.

TABLE 5

Shrinkage, Porosity, Air Permeability (D) and
Modulus of Rupture of RBZM Pellets

| RBZM | Shrinkage % | Porosity % | Permeability $10^3$D (m$^2$/bar · s) | Modulus of Rupture (Mpa) |
|---|---|---|---|---|
| 1 | 2.8 ± 0.3 | 40.1 ± 2.6 | 6.57 ± 0.43 | 5.22 ± 0.85 |
| 2 | 1.1 ± 0.3 | 39.8 ± 3.2 | 4.82 ± 0.39 | 4.71 ± 1.25 |
| 3 | −1.6 ± 0.7 | 44.0 ± 4.6 | 6.34 ± 0.94 | 2.86 ± 0.66 |

EXAMPLE 2

Pressed pellets containing a mixture of coarse and fine magnesia, together with silicon metal powder were fired in air to produce forsterite-bonded magnesia pellets. Table 6 shows the batch compositions of four such formulations (designated MS).

TABLE 6

Wt. % Batch Compositions of MS Formulations

| Component | MS-6 | MS-7 | MS-8 | MS-9 |
|---|---|---|---|---|
| Coarse magnesia (Cerac M-1138, 95% pure, −140 mesh +325 mesh) | 61.59 | 61.59 | 61.59 | 61.59 |
| Fine magnesia (Cerac M-1016, 99.5% pure, −325 mesh, Fisher size 0.25 μm) | 13.57 | 13.57 | 13.57 | 13.57 |
| Si metal, 1-5 μm (AEE SI-100) | 4.73 | 5.91 | 4.73 | 4.73 |
| Degussa P25 fumed TiO$_2$ | 0.0 | 0.0 | 0.8 | 0.0 |
| *Fisher A.R. grade MgCl$_2$.6H$_2$O | 0.0 | 0.0 | 0.0 | 0.9 |
| Ethanol | 4.8 | 4.8 | 4.8 | 4.8 |
| Stearic acid | 1.6 | 1.6 | 1.6 | 1.6 |
| Isopropyl alcohol (IPA) | 6.8 | 6.8 | 6.8 | 6.8 |
| Elvanol grade 85-82 PVA, 5 wt. % solution in hot ethylene glycol | 6.8 | 6.8 | 6.8 | 6.8 |

*Added after previous dehydration (see below)

Composition MS-6 contained stoichiometric amounts of fine MgO and Si metal required for formation of pure forsterite (Mg$_2$SiO$_4$) after Si oxidation and reaction bonding. The target volume ratio of phases in the fired pellets was 70% coarse MgO, 30% forsterite.

Composition MS-7 was derived by increasing the Si content in MS-6 by 25%. This increase was made to investigate whether any significant property changes were produced from reaction of the additional oxidized Si with the coarse MgO component. In this case, the target volume ratio of phases in the fired pellets was ~64% coarse MgO, ~36% forsterite.

Compositions MS-8 and MS-9 were based on that of MS-6, but with the addition of potential sintering aids. Thus, as a fraction of the inorganic solids in each mix, MS-8 and MS-9 contained, respectively, 1 wt. % of fumed TiO$_2$ and 0.5 wt. % MgCl$_2$.

Mixing and Pressing Procedures: Compositions MS-6, -7, and -8 were prepared by briefly dry-milling the inorganic solids (coarse and fine MgO, Si powder; also fumed TiO$_2$ in MS-8) with alumina media to break up agglomerates. The stearic acid was dissolved in a warmed (~50° C.) mixture of ethanol+IPA, added to the powder and thoroughly mixed. Finally, the hot PVA/ethylene glycol solution was added to the mix and blended in.

For composition MS-9, the 0.5 wt. % MgCl$_2$ addition was made by dissolving the appropriate amount of MgCl$_2$.6H$_2$O in ethanol and evaporating to dryness on a hotplate. The dried residue, plus stearic acid, was then dissolved in warmed ethanol/IPA and blended into the milled powders, followed by addition and blending in of the hot PVA/ethylene glycol solution.

A series of ~4-g pellets of each batch composition was pressed and dried as in Examples 1 and 2. The pellet-firing schedule was determined from the results of DTA/TGA analysis on the MS-6 batch material. The DTA/TGA analysis was performed using heating rates in air of 2° C./min to 500° C., and 5° C./min from 500 to 1375° C., followed by holding at 1375° C. (i.e., below the 1410° C. Si melting temperature) for 1 hour to determine the time taken for complete Si oxidation and reaction to occur. Based on the DTA/TGA results, two schedules were employed for pellet firing, each employing a combination of the Carbolite and CM furnaces, as in Examples 1 and 2. The first schedule, referred to as Schedule 1, was used with 10 pellets of MS-6, fired flat on refractory alumina-fiber batts, and was designed to allow periodic pellet-diameter measurements to be made during firing, as follows:

Schedule 1

Carbolite furnace: fired to 500° C. at 2° C./min, and then from 500 to 1375° C. at 5° C./min, holding for 2 h at 1375° C. before cooling to room temperature at 10° C./min. Pellet diameters were measured at this stage.

CM furnace: A 10° C./min heating rate was used for all firings, with pellet diameters being measured after each stage. The pellets were initially fired to 1500° C., held for 5 min, and then cooled. The pellets were re-heated to 1500° C., held for 1 h, and cooled. They were then re-heated to 1500° C. for a further 1 h before cooling. Finally 5 pellets (one half) from each 10-pellet set were re-heated to 1500° C., held for 2 h before final cooling.

The second schedule, referred to as Schedule 2, was based on lessons learned from the experience with Schedule 1, and involved pellet firing using alumina-fiber refractory supports in which a series of grooves had been ground to allow the pellets to be stacked vertically, i.e., on their edges. This schedule was used for firing eight pellets each of MS-6, MS-7, MS-8 and MS-9.

Schedule 2

Carbolite furnace: fired to 500° C. at 2° C./min, from 500 to 1000° C. at 5° C./min, and then from 1000 to 1375° C. at 2° C./min, holding for 2 h at 1375° C. before cooling to room temperature at 10° C./min. Pellet diameters were measured at this stage.

CM furnace: fired to 1500° C. at 10° C./min, and held for 4 h at 1500±10° C. before cooling to room temperature at 10° C./min.

XRD analyses of fired pellets: XRD analyses were made on crushed samples of MS-6 after Schedule-1 firing, and of MS-8 (TiO$_2$-doped composition) after Schedule-2 firing, in order to confirm that all silica from Si oxidation had reacted with MgO to form forsterite. It was particularly important to establish that there was no unreacted cristobalite or other SiO$_2$ polymorph remaining in the final phase assemblage. The XRD analyses confirmed that the only phases present were MgO (periclase) and Mg$_2$SiO$_4$ (forsterite), i.e., that all silica had reacted to form forsterite.

Shrinkage Measurements: The progressive shrinkages shown by the pellet samples are summarized in Table 7.

Shrinkage measurements for MS-6 (schedule 1 firing) and for MS-6, MS-7 and MS-9 (schedule 2 firing) indicate that most shrinkage occurred during the binder burn-off stage, i.e., below the Si oxidation temperature. There would be some expansion as a result of Si oxidation/reaction, particularly during the 2-h hold at 1375° C. Nevertheless, the amount of shrinkage from subsequent 1500° C. sintering was relatively small.

TABLE 7

Progressive Shrinkage Measurements (Mean ± 2SD) during Firing

Composition: MS-6

Schedule 1 firing

| Temperature/time | 1375° C./2-h | 1500° C./0-h | 1500° C./1-h | 1500° C./2-h | 1500° C./4-h |
|---|---|---|---|---|---|
| No. of pellets | 10 | 10 | 10 | 10 | 5 |
| Shrinkage (%) | 1.8 ± 0.2 | 1.9 ± 0.2 | 1.9 ± 0.2 | 2.0 ± 0.2 | 2.1 ± 0.1 |

Schedule 2

| Firing Schedule Composition | No. of pellets | % Shrinkage after 1375° C./2-h | % Shrinkage after 1500° C./4-h |
|---|---|---|---|
| MS-6 | 8 | 1.7 ± 0.1 | 2.1 ± 0.1 |
| MS-7 | 8 | 2.0 ± 0.2 | 2.1 ± 0.1 |
| MS-8 | 8 | 1.9 ± 0.3 | 4.5 ± 0.2 |
| MS-9 | 8 | 1.7 ± 0.1 | 1.8 ± 1.0 |

The MS-8 ($TiO_2$-doped) pellets during schedule 2 firing also gave comparable shrinkages after a 2-h hold at 1375° C. This composition, however, gave further shrinkage during subsequent 1500° C./4-h sintering, which undoubtedly correlates with the strength enhancement (see below) caused by use of a sintering aid.

Shrinkage, Porosity, Permeability and (Cold) Modulus of Rupture Measurements: The properties of each pellet series were measured using standard techniques, with the results (±2 standard deviations) shown in Table 8. The two sets of results for MS-6 are identical, within statistical limits, implying that the change in firing schedule, and in the vertical or horizontal orientation of pellets during firing, had no significant influence on pellet properties.

TABLE 8

Shrinkage, Porosity, Air Permeability (D) and Modulus of Rupture of MS Pellets

| Pellet Series | Firing Schedule | Shrinkage % | Porosity % | Permeability $10^3$D ($m^2$/bar.s) | Flexural Strength (MPa) |
|---|---|---|---|---|---|
| MS-6, 1500° C./4h | 1 | 2.1 ± 0.1 | 32.2 ± 0.9 | 4.28 ± 0.94 | 7.76 ± 1.31 |
| MS-6, 1500° C./4h | 2 | 2.1 ± 0.1 | 32.4 ± 0.8 | 3.41 ± 0.35 | 7.31 ± 0.92 |
| MS-7, 1500° C./4h | 2 | 2.1 ± 0.2 | 28.8 ± 1.1 | 3.38 ± 0.39 | 7.27 ± 0.83 |
| MS-8, 1500° C./4h | 2 | 4.5 ± 0.2 | 27.5 ± 1.7 | 5.03 ± 0.89 | 15.10 ± 1.82 |
| MS-9, 1500° C./4h | 2 | 1.8 ± 0.1 | 32.5 ± 1.0 | 3.40 ± 0.72 | 8.14 ± 1.06 |

Similarly, the increase in Si content, and hence in anticipated forsterite content, in going from the MS-6 to MS-7 composition did not produce any significant change in properties, apart from a slight decrease in porosity. In particular, the strength was not improved, implying that only the forsterite produced from Si oxidation and reaction with fine MgO is effective in bonding the coarse grains together.

The effects of $TiO_2$ doping were quite dramatic. Thus, in comparison with the baseline MS-6 composition, the mean strength was increased by a factor of 2. The mean permeability was increased by ~50%, whereas the mean porosity was slightly decreased. However, the mean firing shrinkage also increased from 2.1% to 4.5%. Nevertheless, these results imply that $TiO_2$-doped MS compositions would be excellent materials for production of extruded monoliths to serve as membrane substrates.

The effects of $MgCl_2$ doping were minimal. Thus, in comparison with the baseline MS-6 composition, there were no notable changes in porosity and permeability, a slight reduction in firing shrinkage, and only a ~10% enhancement is strength that is probably statistically insignificant. Hence, although $MgCl_2$ is a known sintering aid for MgO ceramics, it probably has little influence on Si oxidation and forsterite formation—the main factor in developing strong bonds between coarse MgO grains in MS compositions.

EXAMPLE 3

Pressed pellets containing a mixture of coarse and fine magnesia powders, together with aluminum metal powder, were fired in air to produce spinel-bonded magnesia pellets. Table 9 shows the batch compositions of two such formulations, designated MA. In both cases, the pellet compositions contained stoichiometric amounts of fine MgO and Al metal required for formation of pure spinel ($MgAl_2O_4$) after Al oxidation and reaction bonding. The target volume ratio of phases in the fired pellets was ~60 vol. % coarse MgO (CTE~$13.5 \times 10^{-6}$ $C.^{-1}$), with the balance being spinel (CTE~$8.5 \times 10^{-6}$ $C.^{-1}$).

TABLE 9

Wt. % Batch Compositions of MA Formulations

| Component | MA-1 | MA-2 |
|---|---|---|
| Coarse magnesia (Cerac M-1138, 95% pure, −140 mesh +325 mesh) | 62.3 | 55.4 |
| Fine magnesia (Cerac M-1016, 99.5% pure, −325 mesh, Fisher size 0.25 µm) | 7.6 | 10.5 |
| Al metal, 1-5 µm (AEE AL-104) | 10.2 | 14.1 |
| Ethanol | 4.8 | 4.8 |

TABLE 9-continued

Wt. % Batch Compositions of MA Formulations

| Component | MA-1 | MA-2 |
|---|---|---|
| Stearic acid | 1.6 | 1.6 |
| Isopropyl alcohol (IPA) | 5.6 | 5.6 |
| Elvanol grade 85-82 PVA, 5 wt. % solution in hot ethylene glycol | 8.0 | 8.0 |

Mixing and Pressing Procedures: Compositions MA-1 and MA-2 were prepared by briefly dry-milling the inorganic solids (coarse and fine MgO, Al powder) with alumina media to break up agglomerates. The stearic acid was dissolved in a warmed (~50° C.) mixture of ethanol+IPA, added to the powder and thoroughly mixed. Finally, the hot PVA/ethylene glycol solution was added to the mix and blended in.

Mixing and Pressing Procedures: Compositions MA-1 and MA-2 were prepared by briefly dry-milling the inorganic solids (coarse and fine MgO, Al powder) with alumina media to break up agglomerates. The stearic acid was dissolved in a warmed (~50° C.) mixture of ethanol+EPA, added to the powder and thoroughly mixed. Finally, the hot PVA/ethylene glycol solution was added to the mix and blended in.

A series of ~4-g pellets of each batch composition was pressed and dried as in Examples 1-3. The pellet-firing schedule was determined from the results of DTA/TGA analysis on the MA-1 batch material, using heating rates in air of 2° C./min to 500° C., followed by 5° C./min from 500 to 1400° C. Based on the DTA/TGA results, the following schedule was employed for pellet firing, using a combination of the Carbolite and CM furnaces, as in Examples 1-3:

Carbolite furnace: fired to 500° C. at 2° C./min, and then from 500 to 1400° C. at 5° C./min, holding for 1 h at 1400° C. before cooling to room temperature at 10° C./min. Pellet diameters were measured at this stage.

CM furnace: fired to 1500° C. at 10° C./min, holding for 4 h at 1500±10° C. before cooling to room temperature at 10° C./min.

XRD analysis of fired MA-2 pellet: An XRD analysis was made on a crushed sample of fired MA-2 pellet. The analysis results confirm that the only phases present were MgO and spinel. Thus, complete Al oxidation and reaction with fine MgO had occurred during firing to form spinel.

Shrinkage Measurements: The progressive shrinkages shown by the pellet samples after 1st fire (Carbolite furnace) and $2^{nd}$ fire (CM furnace) are summarized in Table 10. With both compositions, the pellets expanded, giving a negative shrinkage value, during $1^{st}$ fire as a result of Al-metal oxidation. Subsequent shrinkage during high temperature sintering at 1500° C. produced a final shrinkage of ~1.5%

TABLE 10

Progressive Shrinkage Measurements (Mean ± 2SD) during Firing

| Composition | No. of pellets | % Shrinkage after 1400° C./1 h | % Shrinkage after 1500° C./4 h |
|---|---|---|---|
| MA-1 | 8 | −0.5 ± 0.2 | 1.4 ± 0.1 |
| MA-2 | 8 | −0.3 ± 0.1 | 1.5 ± 0.3 |

Shrinkage, Porosity, Permeability and (Cold) Modulus of Rupture Measurements: The properties of each pellet series were measured using standard techniques, with the results (±2 standard deviations) shown in Table 11. The results for each pellet series are identical, within statistical limits, i.e., there is overlap in the ±2SD error bands for each property. These results are comparable with the best results obtained for reaction-bonded forsterite-magnesia substrate materials.

TABLE 11

Property data ± 2SD for MA pellets.

| Pellet Series | Target vol. % MgO/spinel | Shrinkage % | Porosity % | Permeability $10^3$D (m$^2$/bar.s) | Flexural Strength (MPa) |
|---|---|---|---|---|---|
| MA-1 | 70/30 | 1.4 ± 0.1 | 32.5 ± 3.0 | 3.13 ± 0.73 | 8.94 ± 2.28 |
| MA-2 | 60/40 | 1.5 ± 0.3 | 31.4 ± 1.2 | 2.47 ± 0.27 | 11.71 ± 1.48 |

Although specific features of the invention are described in various embodiments, this is for convenience only as each feature may be combined with any or all of the other features in accordance with the invention. Other embodiments will occur to those skilled in the art and are within the scope of the following claims:

What is claimed is:

1. A porous ceramic oxide membrane support formed by sintering a green body containing refractory grains and grains of at least one reactive binder precursor, comprising:
   refractory grains of at least one simple or compound ceramic oxide, wherein the coefficient of thermal expansion of the refractory grains is greater than about $8 \times 10^{-6}$/° C.; and
   at least one reactive binder precursor comprising grains of an element in a non-oxidized state;
   wherein the green body is sintered in an oxidizing atmosphere, and during sintering the grains of the reactive binder precursor react with the oxidizing atmosphere to form a reaction bond to bind the refractory grains; and
   wherein the mean pore size of the membrane support is greater than about 1 micron.

2. The support of claim 1 in which the support configuration is selected from the group consisting of multi-channel monoliths, tubular elements, hollow fibers, and plate structures.

3. The support of claim 1 in which the mean particle size of the refractory grains is in the range of about 5 to about 200 microns.

4. The support of claim 1 in which the refractory grains are selected from the group consisting of alumina, titania, zirconia, magnesia, forsterite, spinel, and mixtures thereof.

5. The support of claim 1 in which the change in volume of the sintered ceramic support from that of the green body is less than about 5%.

6. The support of claim 1 in which the element is selected from the group consisting of aluminum, silicon, titanium, zirconium, and mixtures thereof.

7. The support of claim 1 in which the reactive binder precursor further comprises grains of at least one ceramic compound that react with the element grains in the oxidizing atmosphere to form the reaction bond.

8. The support of claim 1 in which the grain size of the reactive binder precursor is less than about 10 microns.

9. A method of forming a porous ceramic oxide membrane support, comprising;
   a) making a mixture comprising refractory grains of at least one simple or compound ceramic oxide with a coefficient of thermal expansion greater than about $8 \times 10^{-6}/°$ C. and grains of reactive binder precursor comprising at least an element in a non-oxidized state;
   b) forming the mixture into a green body;
   c) sintering the green body in an oxidizing atmosphere to react the grains of the reactive binder precursor with the oxidizing atmosphere to form a reaction bond to bind the refractory grains; and
   d) cooling the sintered body.

10. The support of claim 7 in which the reaction bond is selected from the group consisting of forsterite and spinel.

11. The support of claim 1 in which the oxidizing atmosphere contains molecular oxygen or steam.

12. A membrane device comprising the membrane support of claim 1 and a semipermeable membrane applied to the support.

13. The membrane device of claim 12 in which the semipermeable membrane is selected from the group of membranes consisting of membranes suitable for microfiltration, ultrafiltration, nanofiltration, reverse osmosis, gas separations, vapor permeation and pervaporation.

* * * * *